United States Patent
Oohara et al.

(10) Patent No.: US 6,925,576 B2
(45) Date of Patent: Aug. 2, 2005

(54) CONTROL UNIT AND MULTIPLEX COMMUNICATION SYSTEM USING THE SAME

(75) Inventors: Katsuyuki Oohara, Shizuoka (JP); Yutaka Aoshima, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 544 days.

(21) Appl. No.: 09/941,701

(22) Filed: Aug. 30, 2001

(65) Prior Publication Data

US 2002/0044530 A1 Apr. 18, 2002

(30) Foreign Application Priority Data

Sep. 1, 2000 (JP) ........................... 2000-265108

(51) Int. Cl.[7] .............................. G06F 1/06; G06F 1/32
(52) U.S. Cl. ........................................ 713/500; 713/322
(58) Field of Search ................................ 713/500, 501, 713/322

(56) References Cited

U.S. PATENT DOCUMENTS

| | | | | |
|---|---|---|---|---|
| 3,760,114 A | * | 9/1973 | Morton et al. | 370/242 |
| 5,274,677 A | * | 12/1993 | Ohuchi et al. | 375/356 |
| 5,689,536 A | * | 11/1997 | Iyota et al. | 375/376 |
| 6,266,780 B1 | * | 7/2001 | Grundvig et al. | 713/501 |
| 6,311,296 B1 | * | 10/2001 | Congdon | 714/56 |
| 6,459,705 B1 | * | 10/2002 | Cheng | 370/463 |

FOREIGN PATENT DOCUMENTS

| | | |
|---|---|---|
| JP | 6-138975 | 5/1994 |
| JP | 10-21101 | 1/1998 |

* cited by examiner

Primary Examiner—Lynne H. Browne
Assistant Examiner—Eric Chang
(74) Attorney, Agent, or Firm—Armstorng, Kratz, Quintos, Hanson & Brooks, LLP

(57) ABSTRACT

An abnormality detecting device serves to detect abnormality of a low frequency oscillator. When a prescribed condition is satisfied, if the abnormality detecting device does not detect the abnormality of the low frequency oscillator, a switching device exchanges the clock pulse for operating a CPU from a first clock pulse to a second clock pulse so that the CPU is shifted to a low power consumed state. When a prescribed condition is satisfied, if the abnormality detecting device detects the abnormality of the low frequency oscillator, an exchange stopping device stops the exchange of the clock pulses by the exchange device. In this configuration, even when the abnormality occurs in the low frequency oscillator, disappearance of the information due to the resetting of the CPU can be prevented and the release of the low power consumed state in the other control units will not repeated.

5 Claims, 5 Drawing Sheets

CONTROL UNIT AND MULTIPLEX COMMUNICATION SYSTEM USING THE SAME

BACKGROUND OF THE INVENTION

1. Field of the Invention

This invention relates to a control unit and a multiplex communication system, and more particularly to a control unit for changing the frequency of a clock pulse for a CPU under a prescribed condition into a lower frequency, and a multiplex communication system for executing data communication between such control units connected to a bus line.

2. Description of the Related Art

An example of these control units is shown in FIG. 7. These control units are arranged, e.g. at various parts within a motor vehicle. These control units are connected to each other via a bus line (not shown) to constitute a multiplex communication system.

In FIG. 7, the control unit includes a CPU 10 for executing various kinds of processing or control according to a prescribed program, a ROM 20 which stores the program for the CPU 10 and an RAM 30 which stores various kinds of data and has an area necessary for the processing of the CPU 10.

The CPU 10 is connected to a high frequency oscillator 41 for producing a first clock pulse P1 which operates the CPU 10 at a first frequency and a low frequency oscillator 42 for producing a second clock pulse P2 which operates the CPU 10 at a second frequency lower than the first frequency.

The CPU 10 has functions of deciding that electric appliances within the vehicle are in a non-operating state when an ignition switch has been turned off and a door has been locked, and changing the clock pulse for operating the CPU 10 from the first clock pulse P1 into the second clock pulse P2, thereby shifting to a low electric power consumed state.

The moment that the CPU 10 itself shifts to the low electric power consumed state, it produces a signal requesting other control units to shift to the low electric power consumed state so that the entire multiplex communication system shifts to the low electric power consumed state.

When the CPU 10 detects door unlocking to decide that the electric appliances are in their usable state, it changes the clock pulse for operating itself from the second clock pulse P2 to the first clock pulse P1. Thus, the CPU 10 returns to the high speed processing state.

As described above, when the electric appliances have fallen into their non-used state, the control unit changes the clock pulse for operating the CPU 10 from the first clock pulse P1 at the high frequency into the second clock pulse P2 at the low frequency, thereby reducing power consumption and discharge of a battery.

Generally, the CPU 10 is provided with an output port Pout from which a port output signal S1 is periodically produced through the processing of the program operating within the CPU 10. A watchdog timer 50 serving as an outside monitoring means is connected to the output port Pout.

The watchdog timer 50 continuously monitors the port output signal S1 produced from the output port Pout. As a result of monitoring, if the watchdog timer 50 detects the abnormal state of the CPU 10 (specifically, the port output signal S1 is not detected for a prescribed time), it sends a reset signal S2 to a reset port Prst within the CPU 10.

In response to the reset signal S2, the CPU 10 intends to revert to its initial state to escape from the abnormal state. Therefore, when the CPU 10 has been fallen into the abnormal state such as "runaway", in response to the reset signal S2 produced from the watchdog timer 50, the CPU 10 can revert to its initial state to escape from the abnormal state.

However, with the low frequency oscillator 42 being out of order, when the CPU 10 shifts to the low power consumed state, the CPU 10 becomes disabled. Then, the watchdog timer 50, under the decision that the disabling of the CPU 10 is abnormality, produces the reset signal S2. In response to the reset signal S2 thus produced, the CPU 10 reverts to the initial state and hence the high speed processing state again. Thereafter, the CPU 10 is changed into the low power consumed state. Thus, the processing of reverting to the low power consumed state, resetting and reverting to the high speed processing state will be repeated.

The control unit is so adapted that upon resetting, it produces, via a bus line, a signal requesting other control units to be reset. Therefore, whenever the resetting operation is executed, the low power consumed state of all the control units are released from the low power consumed state, and shift to the high speed processing state.

Namely, when at least one of the low frequency oscillators 40 within the control units which constitute a multiplex communication system becomes out of order, the entire multiplex communication system cannot be shifted to the low power consumed state. This does not reduce the power consumption, and in the worst case, leads to discharging of the battery. This also leads to the problem of disappearance of the information stored in the RAM due to the resetting operation.

SUMMARY OF THE INVENTION

The first object of this invention is to provide a control unit which can prevent information from disappearing owing to resetting of a CPU when abnormality occurs in a low frequency oscillator, and prevent other control units from being released from their low power consumed state.

The second object of this invention is to provide a multiplex communication system provided with such control units.

In order to attain the above first object, in accordance with this invention, as seen from FIG. 1 which shows the basic arrangement of this invention, there is provided a control unit for executing data communication between itself and another control unit comprising:

a CPU 10 which is operated in accordance with a prescribed program;

a high frequency oscillator 41 for producing first clock pulses for operating the CPU at a first frequency;

a low frequency oscillator 42 for producing second clock pulses for operating the CPU at a second frequency which is lower than the first frequency;

an exchanging means 10a for exchanging clock pulses for operating the CPU from the first clock pulses to the second clock pulses when a prescribed condition is satisfied, thereby shifting the CPU to a low power consumed state;

abnormality detecting means 600 for detecting abnormality of the low frequency oscillator; and exchange stopping means 10b for stopping exchange of the clock pulses by the exchange means if the the abnormality detecting means detects the abnormality even when the prescribed condition is satisfied.

In this configuration, the CPU 10 is generally in the high speed processing state operating at the first frequency. The abnormality detecting means 600 detects abnormality of the low frequency oscillator which produces second clock pulses for operating the CPU at a second frequency which is lower than the first frequency. When a prescribed condition is satisfied, if there is not abnormality detection of the low frequency oscillator by the abnormality detecting means, an exchanging means 10a exchanging clock pulses for operating the CPU from the first clock pulses to the second clock pulses, thereby shifting the CPU form the high speed processing state into a low power consumed state.

On the other hand, when the prescribed condition is satisfied, if there is abnormality detection of the low frequency oscillator by the abnormality detecting means, exchange stopping means 10b stops exchange of the clock pulses by the exchange means. The abnormality detecting means is provided separately from an external monitoring means which resets the CPU for each abnormality detection. This abnormality detecting means detects the abnormality of the low frequency oscillator and the exchange stopping means stops exchange of the clock pulses by the exchange means. For this reason, even when abnormality occurs in the low frequency oscillator, the reset of the CPU is not repeated.

In a preferred embodiment, as seen from FIG. 1, the abnormality detecting means includes a counting means 60 for counting the second clock pulses produced from the low frequency oscillator while the CPU is operated at the first frequency.

In this configuration, provision of the counting means for counting the second clock pulses permits abnormality of the low frequency oscillator to be easily detected.

In a preferred embodiment, the exchange stopping means sends an exchange request signal to other control units so that they are shifted into the low power consumed state even when the CPU corresponding to the exchange stopping means cannot be shifted into the low power consumed state.

In this configuration, even when abnormality occurs in the low frequency oscillator of the pertinent control unit, the other control units, in response to the exchange request signal, can be shifted into the low power consumed state.

In order to attain the above second object, in accordance with this invention, there is provided a multiplex communication system for executing data communications among control units which are interconnected via a bus line, wherein each the control units comprises:

a CPU which is operated in accordance with a prescribed program;

a high frequency oscillator for producing first clock pulses for operating the CPU at a first frequency;

a low frequency oscillator for producing second clock pulses for operating the CPU at a second frequency which is lower than the first frequency;

an exchanging means for exchanging clock pulses for operating the CPU from the first clock pulses to the second clock pulses when a prescribed condition is satisfied, thereby shifting the CPU to a low power consumed state;

abnormality detecting means for detecting abnormality of the low frequency oscillator; and exchange stopping means for stopping exchange of the clock pulses by the exchange means if the the abnormality detecting means detects the abnormality when the prescribed condition is satisfied.

The multiplex communication system described above provides the same advantage as that of the control unit described above.

The above and other objects and features of the invention will be more apparent from the following description taken in conjunction with the accompanying drawings.

DESCRIPTION OF THE PREFERRED EMBODIMENTS

Figure 1:
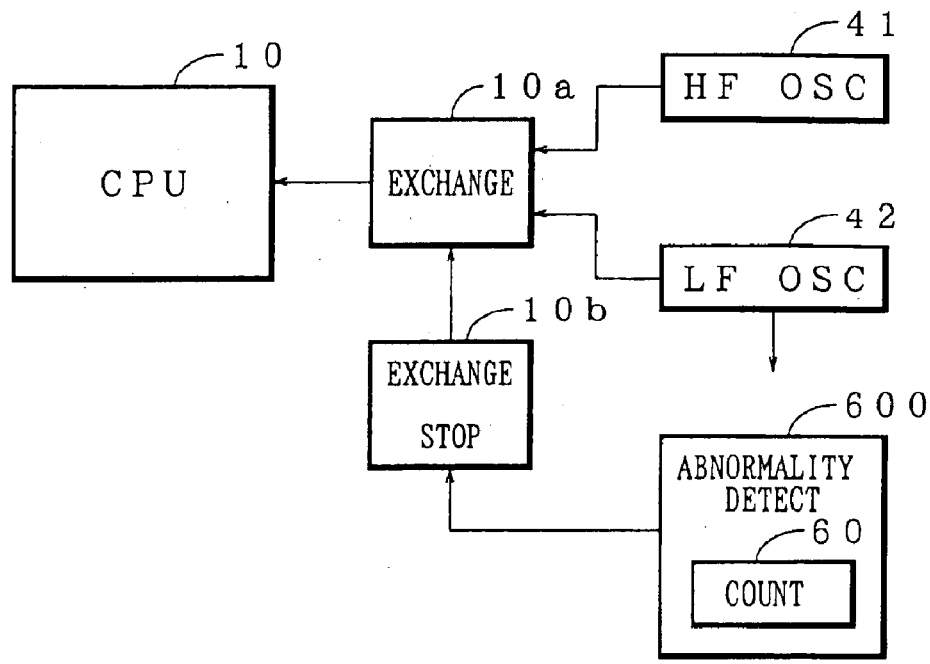
FIG. 1 is a block diagram of a basic arrangement of a control unit and a multiplex communication system according to this invention.
Figure 2:
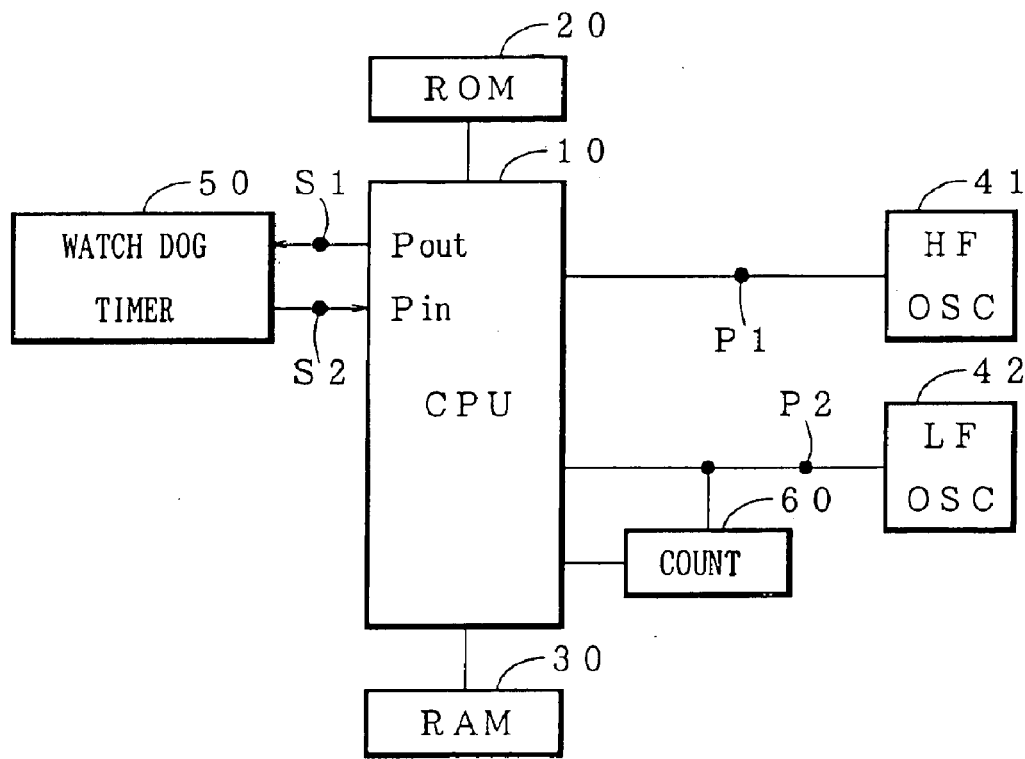
FIG. 2 is a block diagram of an embodiment of the control unit according to this invention.

Now referring to the drawings, an explanation will be given of an embodiment of this invention.

Figure 7:
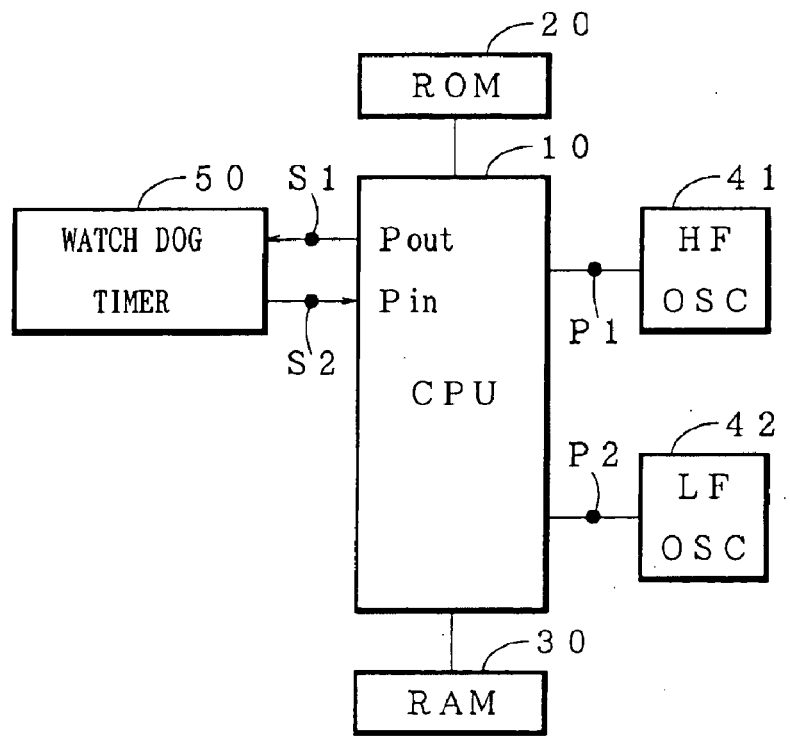
FIG. 7 is a block diagram of an example of a conventional control unit.

FIG. 1 is a block diagram of the control unit of FIG. 1. In FIG. 1, like reference numerals denote like blocks in FIG. 7.

Figure 3:
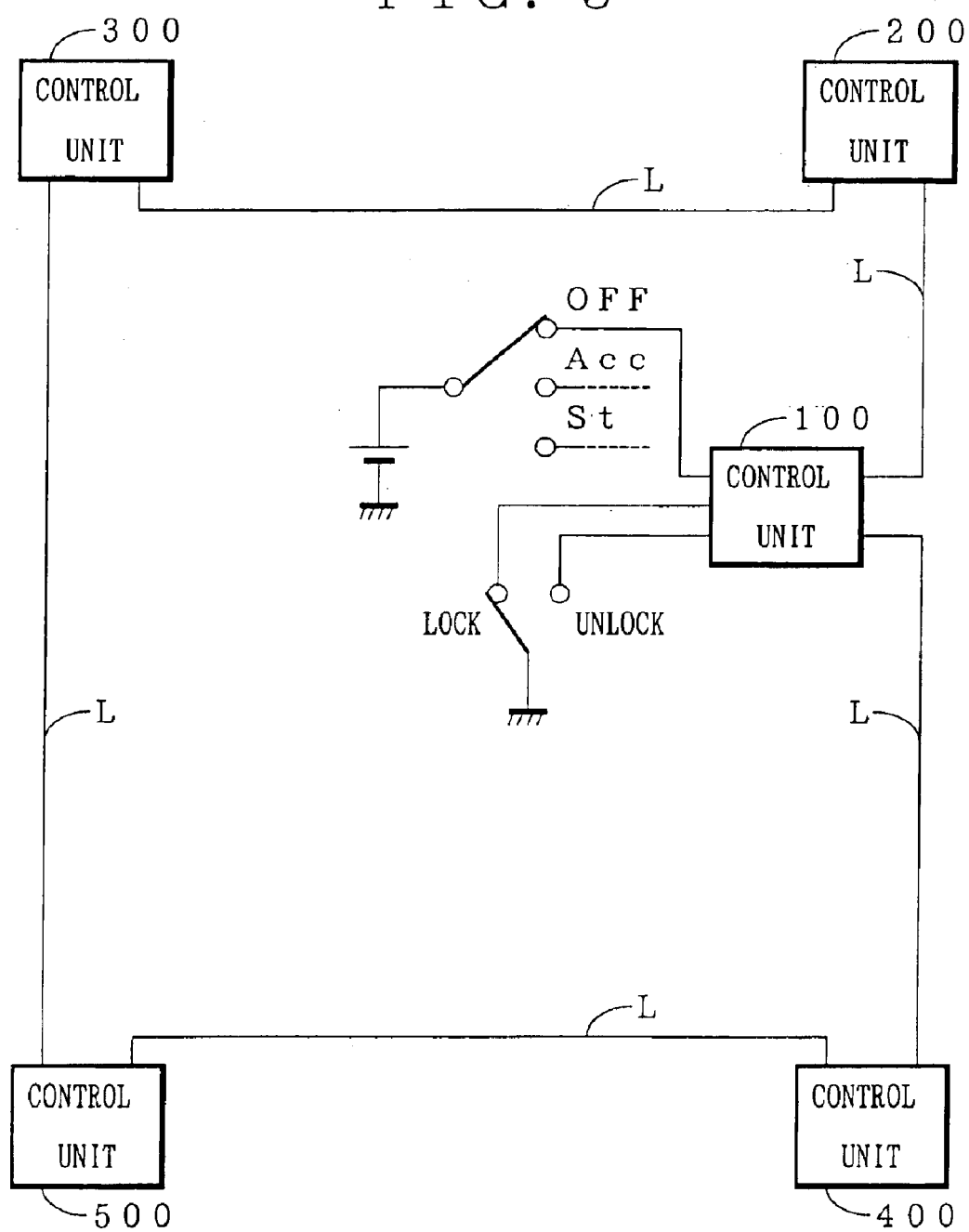
FIG. 3 is a block diagram of an embodiment of a multiplex communication system equipped with the control unit according to this invention.

The control unit according to this invention also includes a counter 60 which is a counting means for counting the second pulses P2 produced from the low frequency oscillator 42. The counter 60 supplies the counted value to the CPU 10. Control units 100–500 each having the configuration described above are arranged at various parts of a motor vehicle as shown in FIG. 3. These control units 100–500 are connected to one another via a bus line L to constitute a multiplex communication system for executing data communication among the control units.

Incidentally, the CPU within the control unit 100 provided at a driver's seat is connected to an OFF terminal of an ignition switch SW1 and an lock terminal and an unlock terminal of the door switch SW2. Therefore, the CPU 100 of the control unit 100 can know the OFF state of the IG switch SW1 and the locked/unlocked state of the IG switch SW1.

The CPU 10 provided in each of the control units 100–500 executes the processing of changing the clock pulse for operating the CPU 10 under a prescribed condition from a first clock pulse P1 to a second clock pulse P2 so that the CPU 10 is shifted into the low power consumed state, executes processing of detecting abnormality of the low frequency oscillator 42, and executes processing of stopping the changing of the clock pulse when the abnormality of the low frequency oscillator 42 is detected in another prescribed condition.

Figure 4:
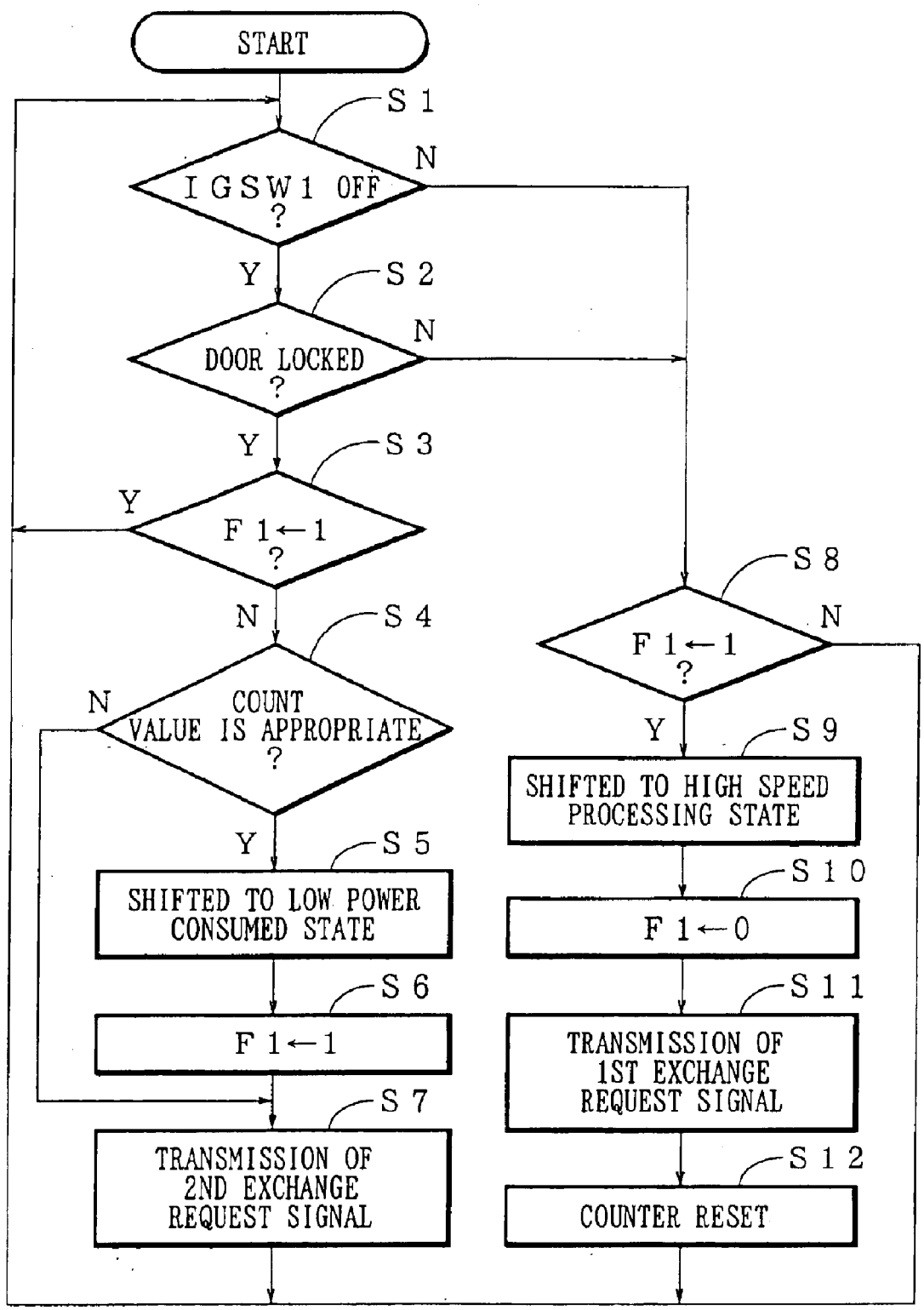
FIG. 4 is a flowchart showing the procedure of interruption in a CPU which constitutes the control unit of FIG. 2.

Referring to the processing procedure of the CPU 10 shown in FIGS. 4–6, an explanation will be given of the multiplex communication system equipped with the control units as described above. First, referring to the flowchart of FIG. 4 which shows the processing procedure of the CPU 10 installed in the control unit 100, an explanation will be given of the operation of the CPU 100 which is connected to the OFF terminal of the IG switch SW1 and the door lock terminal and door unlock terminal of the door switch SW2.

The CPU 10 within the control unit 100 starts to operate when a vehicle-installed battery VB shown in e.g. FIG. 3 is turned on. In initial step, initial setting is made for various kinds of areas formed in the RAM 30. If the IG switch SW1 is OFF (Y in step S1) and the door is in the locked state (Y in step S2), the CPU 10 determines whether or not the flag F1 is ON (step S3). The flag F1 indicates whether or not the CPU 10 is in the low power consumed state.

If the CPU 10 is not still in the low power consumed state, i.e. the flag F1 is OFF (N in step S3), the CPU 10 determines that with the IG switch SW1 turned OFF, a driver goes out of the vehicle and has just locked the door so that the state where the in-vehicle electrical components are not used will continue, and the processing procedure proceeds to step S4. On the other hand, if the flag F1 is ON (Y in step S3), the CPU 10 determines that it has shifted into the low power consumed state. The processing procedure by the CPU 10 returns to step S1 to hold the low power consumed state. In step S4, the CPU 10 serves as an abnormality detecting means, i.e. captures the count value counted by the counter 60 to determine whether or not the count value is appropriate.

While the IG switch SW1 is ON, the CPU 10 is operated by the first clock pulse P1 and in the high speed processing state. While the CPU 10 is in the high speed processing state, the counter 60 counts the second clock pulses P2 which are produced from the low frequency oscillator 42.

Therefore, if the abnormality such as malfunction does not occur in the low frequency oscillator 42, i.e. the count value is appropriate (Y in step S4), the CPU 10 serves as a changing means which changes the clock pulse for operating itself from the first clock pulse P1 to the second clock pulse P2 so that the CPU 10 shifts into the low power consumed state (step S5). Simultaneously, the CPU 10 turns ON the flag F1 to indicate that the CPU 10 is in the low power consumed state (step S6).

On the other hand, if the abnormality such as malfunction occurs in the low frequency oscillator 42, e.g., the counted value is an abnormal value such as zero (N in step S4), the CPU 10 serves as changing stopping means and holds its high speed processing state without executing steps S5 and S6 for changing the clock pulse. Further, the CPU 10 transmits the second changing request signal via the bus line L to other control units 200–500 (step S7), and reverts to step S1.

The second exchange request signal is a signal for requesting the other control units 200–500 to shift to the low power consumed state. As described above, in step S6, if the second exchange request signal is transmitted regardless with the state of the CPU 10, even if any abnormality occurs in the low frequency oscillator 42 within the control unit 100, the other control units 200–500 receives the second exchange request signal under a prescribed condition to shift to the low power consumed state.

It should be noted that the counted value of the counter 60 is initialized to indicate an appropriate value. Therefore, when the processing procedure proceeds to step S4, immediately after the in-vehicle battery is turned on, decision of abnormality is not made.

Thereafter, if the man staying within the vehicle turns on the IG switch (N in step S1), or the driver unlocks the door enter the vehicle (Y in step S2), the CPU 10 captures the flag F1 to determine whether itself is in the low power consumed state (step S8). At this time, if the CPU 10 has fallen in the high speed processing state, the processing procedure immediately reverts to step S1, thereby maintaining the high speed processing state. On the other hand, if the CPU 10 is in the low power consumed state (Y in step S8), the CPU 10 itself exchanges the clock pulses from the second clock pulse P2 to the first clock pulse P1, reverting its state to the high speed processing speed. Simultaneously, CPU 10 turns off the flag F1 to indicate the high speed processing state (step S10).

Thereafter, the CPU 10 transmits the first changing request signal via the bus line L to other control units 200–500 (step S11), and also produces the signal for resetting the counted value of the counter 60 (step S12). The first exchange request signal is a signal for requesting the other control units 200–500 to shift to the high speed processing state.

Figure 5:
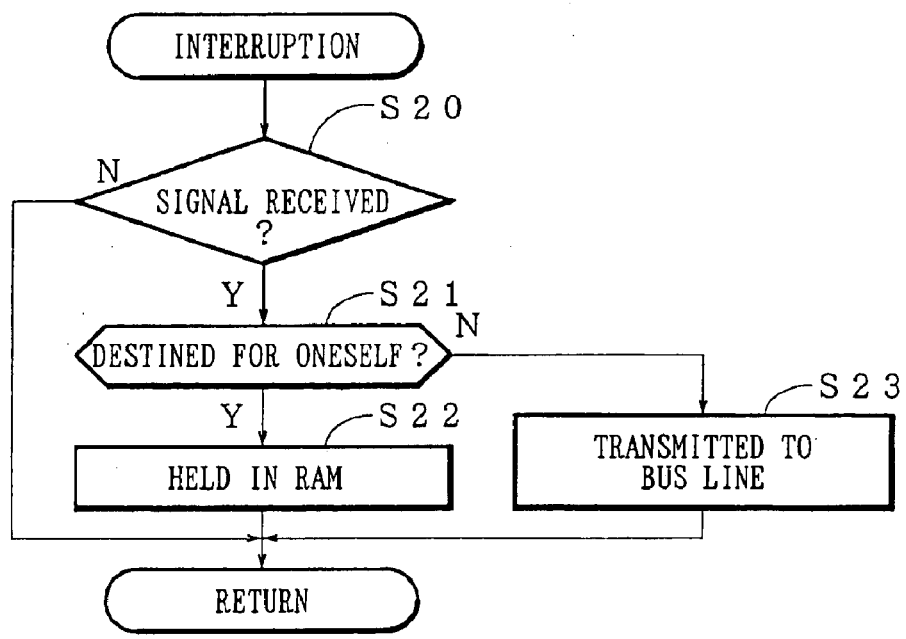
FIG. 5 is a flowchart -of the procedure of processing in the CPU which constitutes the control unit 100 in FIG. 3.

The CPU 10 which constitutes the control units 100–500 inclusive of the control unit 100 executes the interruption at intervals of a prescribed time as shown in FIG. 5. Namely, when the CPU 10 in the control unit 100 receives a signal through the bus line L (Y in step S20), it determines whether or not the signal is destined for itself (step S21).

If the signal is destined for the CPU 10 itself (Y in step S21), the signal is held in the RAM 30, and the processing procedure returns to the normal course. On the other hand, if the signal is destined for other control units, but not destined for the CPU 10 itself, the signal is not held in the RAM 30, but transmitted to the bus line L. Thus, the signal transmitted to the CPU 10 itself is held in the RAM.

Figure 6:
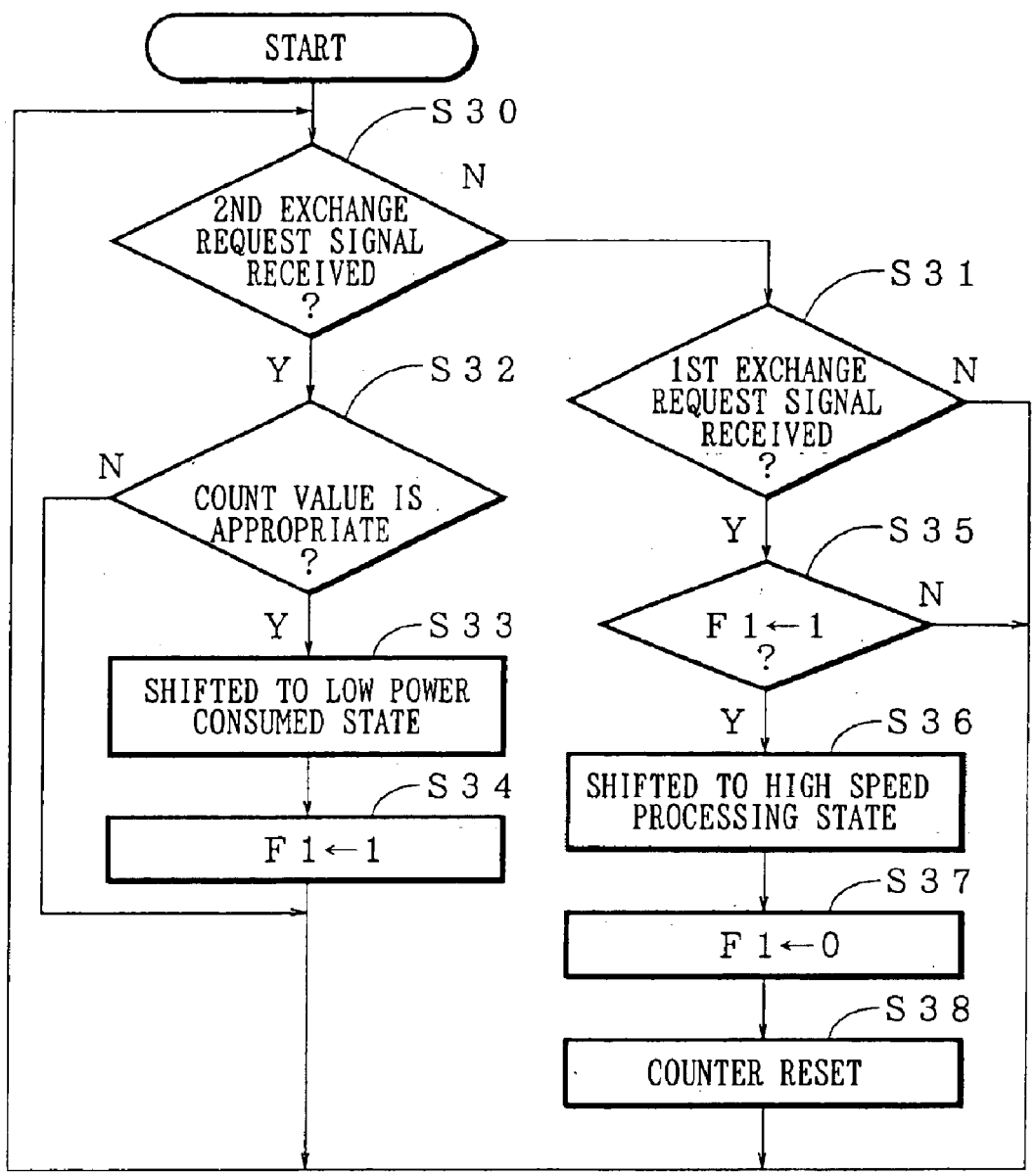
FIG. 6 is a flowchart of the procedure of processing in the CPU which constitutes the control units 200-500 in FIG. 3.

Referring to the flowchart of FIG. 6 showing the processing procedure of the CPU 10 in the control units 200–500, an explanation will be given of the operation of each of the control units 200–500.

The CPU 10 in each of these control units 200-500, also starts to operate, as in the control unit 100, when the in-vehicle battery VB is turned on. In initial step (not shown), initial setting is made for various kinds of areas formed in the RAM 30.

Thereafter, the CPU 10 reads the state within the RAM 30 to determine whether the second switching request signal or the first switching request signal has been received (step S30 or S31). If neither signal is received (N in step S30 and N in S31), the CPU 10 maintains its present state to returns to step S30. At this time, if the CPU 10 is in the high speed processing state, the counter 60 counts the second clock pulses produced from the low frequency oscillator 42.

Thereafter, under a prescribed condition, i.e., if the second exchange request signal is transmitted from the control unit 100 (Y in step S30), the CPU 10 serves as an abnormality detecting means, i.e. captures the count value counted by the counter 60 to determine whether or not the counted value is appropriate (step S32). If the abnormality such as malfunction does not occur in the low frequency oscillator 42, i.e. the counted value is appropriate (Y in step S32), the CPU 10 serves as a changing means to shift itself into the low power consumed state according to the second changing request signal (step S33). Simultaneously, the CPU 10 turns ON the flag F1 to indicate that the CPU 10 is in the low power consumed state (step S6).

On the other hand, if the abnormality such as malfunction occurs in the low frequency oscillator 42, e.g., the counted value is an abnormal value such as zero (N in step S32), the CPU 10 serves as changing stopping means and holds its high speed processing state without executing steps S33 and S34 for changing the clock pulse, thereafter returning to step S30. Incidentally, the counted value in the counter 60 has been initialized so that it exhibits an appropriate value. Therefore, when the processing procedure advances to step S32 immediately after the in-vehicle battery is turned on, abnormality is not decided.

Thereafter, if the CPU 10 receives the first exchange request signal (Y in step S31), it determines whether or not the flag F1 is "ON" and it is in the low power consumed state (step S35). If the CPU 10 is in the low power consumed state (Y in step S35), it reverts to the high speed operating state according to the first exchange request signal (step S36).

Simultaneously, the CPU 10 turns OFF the flag F1 in order to exhibit the high speed processing state (step S37). Thereafter, the CPU 10 produces the signal for resetting the counted value of the counter 60 (step S38), and reverts to step S30.

As described above, the control unit 100–500 according to this invention detects the abnormality of the low frequency oscillator 42 on the basis of the counted value of the counter 60 which is provided separately from the watched dog timer 50 (external monitoring means) which resets the CPU 10 for each detection of the abnormality. In addition, if the control unit detects the abnormality, it stops the exchange from the first clock pulse P1 to the second clock pulse P2. For this reason, even when the abnormality occurs in the low frequency oscillator 42, disappearance of the information due to the resetting of the CPU 10 can be prevented and the release of the low power consumed state in the other control unit will not repeated.

Since the abnormality in the low frequency oscillator 42 is detected on the basis of the value counted by the counter 60, provision of the counter 60 for counting the second clock pulses P2 permits the abnormality of the low frequency oscillator 42 to be easily detected. This simplifies the configuration of the multiplex communication system and realizes the production cost thereof.

In the embodiment described above, the abnormality in the low frequency oscillator was detected on the basis of the counted value in the counter 60 which counts the second clock pulses P2. However, the abnormality may be detected by the output from a re-triggerable multivibrator (RMB) which is triggered by the rising edge of the second clock pulse P2.

The RMB is structured so as to hold the H level for a time T elapsed from the rising edge of the second clock pulse, and has a re-trigger function that the output H level is extended when the RMB is triggered again by the second clock pulse P2 while the H level is held. Therefore, if the time T is set to be longer than the rising period of the second clock pulse P2, the RMB maintains the output H level while the low frequency oscillator is in the normal operating state. On the other hand, when the second clock pulse P2 is stopped as a result that the abnormality such as malfunction occurs in the low frequency oscillator, the output level of the RMB becomes an L level.

What is claimed is:

1. A control unit for executing data communication between itself and another control unit, the control unit outputting a signal for resetting said another control unit through a bus line when the control unit is reset, comprising:
   a CPU which is operated in accordance with a prescribed program;
   a watchdog timer for monitoring operations of the CPU and outputting a reset signal to return the CPU to an initial condition when an abnormal state of the CPU is detected;
   a high frequency oscillator for producing first clock pulses for operating the CPU at a first frequency;
   a low frequency oscillator for producing second clock pulses for operating the CPU at a second frequency which is lower than said first frequency;
   exchanging means for exchanging clock pulses for operating the CPU from said first clock pulses to said second clock pulses when a prescribed condition is satisfied, thereby shifting the CPU to a low power consumed state;
   abnormality detecting means for detecting abnormality of the low frequency oscillator; and
   exchange stopping means for stopping exchange of the clock pulses by said exchanging means if said abnormality detecting means detects the abnormality when said prescribed condition is satisfied.

2. A control unit according claim 1, wherein said abnormality detecting means includes a counting means for counting the second clock pulses produced from said low frequency oscillator while said CPU is operated at the first frequency.

3. A control unit according to claim 1, wherein said exchange stopping means sends an exchange request signal to the another control unit so that they are shifted into the low power consumed state even the CPU corresponding to said exchange stopping means cannot be shifted into the low power consumed state.

4. A control unit according to claim 2, wherein said exchange stopping means sends an exchange request signal to the another control unit so that they are shifted into the low power consumed state even when the CPU corresponding to said exchange stopping means cannot be shifted into the low power consumed state.

5. A multiplex communication system for executing data communications among control units which are interconnected via a bus line, one of the control units outputting a signal for resetting other control units via the bus line when the control unit is reset, wherein each said control units comprises:
   a CPU which is operated in accordance with a prescribed program;
   a watchdog timer for monitoring operations of the CPU and outputting a reset signal to return the CPU to an initial condition when an abnormal state of the CPU is detected;
   a high frequency oscillator for producing first clock pulses for operating the CPU at a first frequency;
   a low frequency oscillator for producing second clock pulses for operating the CPU at a second frequency which is lower than said first frequency;
   exchanging means for exchanging clock pulses for operating the CPU from said first clock pulses to said second clock pulses when a prescribed condition is satisfied, thereby shifting the CPU to a low power consumed state;
   abnormality detecting means for detecting abnormality of the low frequency oscillator; and
   exchange stopping means for stopping exchange of the clock pulses by said exchange means if said abnormality detecting means detects the abnormality when said prescribed condition is satisfied.

* * * * *